(12) United States Patent
Zhu et al.

(10) Patent No.: US 12,119,921 B2
(45) Date of Patent: Oct. 15, 2024

(54) RESOURCE ALLOCATION METHOD FOR UNMANNED AERIAL VEHICLE-ASSISTED SYMBIOTIC RADIO SYSTEM

(71) Applicant: NANJING UNIVERSITY OF POSTS AND TELECOMMUNICATIONS, Nanjing (CN)

(72) Inventors: Qi Zhu, Nanjing (CN); Yaping Zhang, Nanjing (CN)

( * ) Notice: Subject to any disclaimer, the term of this patent is extended or adjusted under 35 U.S.C. 154(b) by 0 days.

(21) Appl. No.: 18/619,923

(22) Filed: Mar. 28, 2024

(65) Prior Publication Data
US 2024/0275472 A1    Aug. 15, 2024

Related U.S. Application Data

(63) Continuation of application No. PCT/CN2023/123784, filed on Oct. 10, 2023.

(30) Foreign Application Priority Data

Feb. 1, 2023    (CN) .......................... 202310087682.3

(51) Int. Cl.
    *H04B 7/185*    (2006.01)
(52) U.S. Cl.
    CPC ..... *H04B 7/18513* (2013.01); *H04B 7/18504* (2013.01)
(58) Field of Classification Search
    CPC ............. B64C 39/024; B64U 2101/00; B64U 2201/104; B64U 50/38; H04W 4/40; H04W 24/02; H04W 84/18; H04W 16/18; H04W 72/0446; H04W 84/06; H04B 7/18506; H04B 7/18504; H04L 67/12; H04L 67/10
    See application file for complete search history.

(56) References Cited

U.S. PATENT DOCUMENTS

2022/0014880 A1    1/2022    Lee et al.

FOREIGN PATENT DOCUMENTS

| CN | 112532300 A |   | 3/2021 |
|----|-------------|---|--------|
| CN | 113625751 A | * | 11/2021 |
| CN | 115002800 A |   | 9/2022 |

OTHER PUBLICATIONS

Wang et al. 'Resource allocation for UAV-assisted backscatter communication', pp. 1-17, Apr. 10, 2022. (Year: 2022).*
Internation Search Report of PCT/CN2023/123784, Mailed Nov. 21, 2023.

(Continued)

*Primary Examiner* — Khalid W Shaheed

(57) ABSTRACT

The present application provides a resource allocation method for a unmanned aerial vehicle (UAV)-assisted symbiotic radio system, which addresses the problem of how to improve the system transmission rate in a multi-IoT device scenario. A passive sensor data collection mechanism based on a UAV-assisted symbiotic radio communication system under multiple backscatter devices (BDs) is proposed. When the base station sends signals to the cellular users, multiple IoT BDs on the ground perform energy collection and backscatter of RF signals sent by the base station, and the UAV receives backscatter signals from the BDs and collects the data from all the BDs on the ground, i.e., all the BDs share RF sources with the cellular users.

8 Claims, 2 Drawing Sheets

(56) References Cited

OTHER PUBLICATIONS

Gazestani, Amirhosein Hajihoseini et al., "Resource Allocation in Full-Duplex UAV Enabled Multismall Cell Networks", IEEE Transactions on Mobile Computing, vol. 21, No. 3, Mar. 31, 2022, 1049-1060, Entire Document.

Jiang, Xu et al., "UAV-Assisted Networks With Underlaid Ambient Backscattering: Modeling and Outage Analysis", 2022 IEEE Global Communications Conference: Cognitive Radio and AI-Enabled Network Symposium, Dec. 8, 2022, 4947-4952, Entire Document.

* cited by examiner

→ RF transmission
⇢ Backscatter
⇠ interference

RESOURCE ALLOCATION METHOD FOR UNMANNED AERIAL VEHICLE-ASSISTED SYMBIOTIC RADIO SYSTEM

CROSS-REFERENCE TO RELATED APPLICATIONS

The present application claims priority to Chinese Patent Application No. 202310087682.3, titled "Resource Allocation Method for Unmanned Aerial Vehicle-Assisted Symbiotic Radio System", filed Feb. 1, 2023, the entire disclosure of which is incorporated herein by reference.

TECHNICAL FIELD

The present application relates to the field of communication technology, and specifically to a resource allocation method for a unmanned aerial vehicle (UAV)-assisted symbiotic radio system.

BACKGROUND

With the development of IoT applications, the communication of large-scale IoT devices requires huge energy and communication resources, and how to ensure that IoT devices complete effective communication with limited resources is one of the important issues. In order to solve the problem of service life of the battery of IoT terminals, using RF energy collecting technology can extend the service life of the battery of these devices. That is, IoT devices can collect energy from Radio Frequency (RF) emission sources to extend the service life of the battery. Ambient Backscatter Communication (AmBC) technology not only avoids the use of active RF components, which can save energy and reduce costs, but also improves the utilization of spectrum resources by using existing RF signals without allocating new spectrum for its system. As an emerging symbiotic radio technology, it transmits signals to complete wireless communications through backscatter modulation, using modulated ambient RF signals (e.g., TV towers, cellular base stations, and Wi-Fi systems, etc.) instead of unmodulated dedicated signals. Since the Backscatter Device (BD) communication shares the spectrum with the existing system, it will cause large interference, so how to reduce the interference and improve the transmission rate of the system by reasonable resource allocation has become a research hotspot. For the problem of limited communication range and low rate due to dual channel fading in the backscatter system, an effective solution is to let the unmanned aerial vehicle (UAV) replace the RF transmitter or receiver, etc. The UAV-assisted wireless communication has attracted more and more research interests from both academia and industry because of its flexible deployment, fully controllable mobility and high probability of line of sight (LOS) connection from the air to the ground, etc. Therefore, it is considered that UAV-based symbiotic radio systems can effectively improve the transmission rate of backscatter devices.

SUMMARY

The purpose of the present application is to propose a resource allocation method for a unmanned aerial vehicle (UAV)-assisted symbiotic radio system, which addresses the problem of how to improve the transmission rate of the system in a multi-IoT device scenario, and proposes a passive sensor data collection mechanism based on a UAV-assisted symbiotic radio communication system under a plurality of backscatter devices, which achieves the goal of maximizing the backscatter rate of all devices by optimizing the position of the UAVs and the communication resources in the system (backscatter coefficient and the time allocated to reflections) to maximize the backscatter rate of all devices.

In order to solve the above technical problems, the technical solution adopted in the present application is as follows.

In a first aspect, the present application provides a resource allocation method for a unmanned aerial vehicle (UAV)-assisted symbiotic radio system, including a base station (BS) and a plurality of backscatter devices (BDs) distributed within a coverage area of the BS and a cellular user;

wherein when the BS sends a signal to the cellular user, the BDs within the coverage area of the BS collect energy of a radio frequency signal sent from the BS and perform backscatter with a time division multiple access method, and the UAV receives backscattered signals from the BDs and collects data from all the BDs on a ground;

wherein the resource allocation method for the symbiotic radio system includes:

constructing an optimization problem for the UAV-assisted symbiotic radio system by taking that maximizing a sum rate of all the BDs, and guaranteeing a minimum rate of each BD and QoS requirements of the cellular user as an objective function and constraints;

solving the optimization problem to obtain time allocations of the BDs, reflection coefficients of the BDs and a position of the UAV of joint optimization for each time period in a preset period; and based on obtained the time allocations of the BDs, the reflection coefficients of the BDs and the position of the UAV of the joint optimization for each time period, collecting the data by the UAV-assisted symbiotic radio system in a preset cycle.

In one embodiment, the S3 includes:

dividing a total communication time T of the preset cycle into N time periods on average, wherein $\delta$ is a time length of one time period;

S301, the UAV flying to hover at a position $q_n$ of the UAV in a first time period obtained by the joint optimization over a range where the BDs on the ground are located, n=1;

S302, in response to the BS sending the signal, all BDs within the coverage area of the BS collecting energy of the signal according to a time length $\tau_{k,n}^b$ allocated to the BDs and the reflection coefficients $\beta_{k,n}$ of the BDs obtained by the joint optimization;

S303, the BDs located within a communication range of the UAV performing backscatter with the time division multiple access (TDMA) method according to the time length $\tau_{k,n}^b$ allocated to the BDs obtained by the joint optimization, and transmitting reflected information of the BDs to the UAV by using the signal sent from the BS;

S304, after a time length $\delta$ of one time period, the UAV collecting completely data at a current position, n=n+1, and the UAV flying to hover at a position $q_n$ of the UAV in a next time period obtained by the joint optimization; and S305, repeating S302 and S304 according to the obtained the time allocations of the BDs, the reflection coefficients of the BDs and the position of the UAV in the next time period of the joint optimization for each time period until the UAV returns to an initial position and collects completely the data.

In one embodiment, the constructing the optimization problem for the UAV-assisted symbiotic radio system includes:

S101, constructing a computational model of total energy $E_k$ collected by a $K_{th}$ BD during the communication time T based on the time length $\tau_{k,n}^b$ allocated to the BDs and the reflection coefficients $\beta_{k,n}$ of the BDs;

S102, constructing a computational model of a transmission rate $R_s(n)$ of the BS to the cellular user, and a backscattered transmission rate $R_{c,k}(n)$ of the $K_{th}$ BD at the time $\tau_n$; and S103, constructing the optimization problem of the UAV-assisted symbiotic radio system based on the computational model of $E_k$, $R_s(n)$, and $R_{c,k}(n)$.

In one embodiment, the S101 includes:

when the BD is located within the communication range of the UAV, the received signal of the BD is divided into two portions, one portion is configured to support the backscattered transmission of the BD, and energy of the other portion is collected by the BDs for consumption by their circuits;

wherein $\alpha_{k,n} \cdot k \in \{1,2, \ldots, k, \ldots, K\}$, $n \in \{1,2, \ldots, n, \ldots, N\}$ represents 0-1 indication coefficient that indicates whether or not the BD is backscattered, K is a total number of the BDs, and N represents that a number of time periods by which a total communication time is divided into, and when the $K_{th}$ BD is located within the communication range of the UAV at the time $\tau_n$, i.e., a horizontal distance between the UAV and the $K_{th}$ BD is less than or equal to the communication radius r of the UAV, $\alpha_{k,n}=1$, a formula is:

$$a_{k,n} = \begin{cases} 1, & \|q_n - w_k\| \le r \\ 0, & \|q_n - w_k\| > r \end{cases};$$

where $q_n$ is a two-dimensional position of the UAV at the time $\tau_n$, $w_k=(w_k^x, w_k^y)$ is the two-dimensional position of the $K_{th}$ BD, the communication radius is $r=H \tan\theta$, H is a height of the UAV, and $\theta$ is an effective communication angle of the UAV, backscatter time allocated to the $K_{th}$ BD is expressed as $\tau_{k,n}^b = \alpha_{k,n} \tau_{k,n}$;

assuming that channel state information is known, channel gains from the BS to the cellular user, from the BS to the $K_{th}$ BD and from the $K_{th}$ BD to the cellular user are denoted by $h_{0,n}$, $h_{k,n}^s$, $g_{k,n}^l$, and assuming that these three terrestrial channels take into account both large-scale and small-scale fading, formulas are:

$$h_{0,n} = \xi_0 (d_{0,n})^{-\alpha} \|\mu_{0,n}\|^2$$

$$h_{k,n}^s = \xi_0 (d_{k,n}^s)^{-\alpha} \|\mu_{k,n}^s\|^2$$

$$g_{k,n}^l = \xi_0 (d_{k,n}^l)^{-\alpha} \|\mu_{k,n}^l\|^2;$$

where $d_{0,n} = \sqrt{\|q_L - q_B\|^2}$, $d_{k,n}^s = \sqrt{\|q_B - w_k\|^2}$, $d_{k,n}^l = \sqrt{\|q_L - w_k\|^2}$ denote distances of the BS from the cellular user and the $K_{th}$ BD, and a distance of the $K_{th}$ BD from the cellular user, respectively, and $q_B$ and $q_L$ denote a two-dimensional position of the BS and a two-dimensional position of the cellular user, respectively, and $\mu_{0,n}$, $\mu_{k,n}^s$ and $\mu_{k,n}^l$ denote small-scale fading components, $\xi_0$ is a channel power gain when $d_0=1$m, and $\alpha$ represents a path loss exponent;

channel gains from the BS to the UAV and from the $K_{th}$ BD to the UAV are denoted as $h_{1,n}$, $g_{k,n}^u$, respectively, and a communication between the BS and the UAV is a line-of-sight channel, considering only the large-scale fading, denoted as:

$$h_{1,n} = \xi_0 (d_{1,n})^{-2}$$

$$g_{k,n}^u = \xi_0 (d_{k,n}^u)^{-2};$$

where $d_{1,n}$ is a distance between the BS and the UAV, and $d_{k,n}^u$ is a distance between the UAV and the BD;

when at the time $\tau_n$, when the $K_{th}$ BD performs no backscatter communication, $\alpha_{k,n}=0$, all signals received by the $K_{th}$ BD are used for energy collection; when the $K_{th}$ BD performs the backscatter communication and energy collection simultaneously, then $\alpha_{k,n}=1$; $\beta_{k,n}$ denotes the reflection coefficient of the BD at the time $\tau_n$, and $0 \le \beta_{k,n} \le \beta_{max}$, $\beta_{max}$ ($0 < \beta_{max} < 1$) is the maximum reflection coefficient that is achievable in practical applications;

the total energy $E_k$ collected by the $K_{th}$ BD during the communication time T is:

$$E_k = \sum_{n=1}^{N} \eta_k \left[ \tau_{k,n}^b P(1-\beta_{k,n}) h_{k,n}^s + P h_{k,n}^s (T/N - \tau_{k,n}^b) \right]$$
$$= \sum_{n=1}^{N} \eta_k P h_{k,n}^s (T/N - \tau_{k,n}^b \beta_{k,n})$$

where P is a transmitting power of the BS, $\eta_k$ is an energy collection efficiency factor of each BD, and the total communication time T is divided equally into N time periods, $\tau_{k,n}^b$ represents the time length allocated to the BDs within the communication range of the UAV at the time $\tau_n$.

In one embodiment, the S102 includes:

communicating between the UAV and the BDs with the time division multiple access method; assuming that the total communication time is divided equally into N time periods, i.e., $T=N\delta$, the position of the UAV on a two-dimensional horizontal plane at the time $\tau_n$, $n \in \{1,2, \ldots, n, \ldots, N\}$ is represented as $q_n=(x_n, y_n)$;

the UAV hovers over the position $q_n$ in each time period $\tau_n$, at which time the BDs on the ground communicate with the UAV by the TDMA, $l \in \{1,2, \ldots, k, \ldots, K\}$ is the time length allocated to the BDs; the time length allocated to the BD within the communication range of the UAV at the time $\tau_n$ is $\tau_{k,n}^b = \alpha_{k,n} \tau_{k,n}$;

$S_n$ denotes a main transmission signal sent by the BS at the time $\tau_n$, $E[\|S_n\|^2]=1$, then the transmission signal $y_{b,k}(n)$ received by the $K_{th}$ BD from the BS is:

$$y_{b,k}(n) = \sqrt{P h_{k,n}^s} S_n;$$

$C_{k,n}$ denotes the signal of the $K_{th}$ BD at the time $\tau_n$, $E[\|C_n\|^2]=1$, the signal $y_{k,n}'(n)$ backscattered by the BD is:

$$y_{k,n}'(n) = a_{k,n} \sqrt{P \beta_{k,n} h_{k,n}^s} S_n C_{k,n};$$

a reflected signal of the $K_{th}$ BD disturbs the cellular user, the received signal $y_l(n)$ of the cellular user at the time $\tau_n$ is:

$$y_l(n) = \sqrt{P h_{0,n}} S_n + \sum_{k=1}^{K} y_{k,n}'(n) \sqrt{g_{k,n}^l} + Z_n^l;$$

where $Z_n^l$ is a noise received by the cellular user and $Z_n^l \sim (0, \sigma_l^2)$;

a signal-to-noise ratio $\gamma_s(n)$ of decoding a main transmission signal $S_n$ by the cellular user is calculated:

$$\gamma_s(n) = \frac{Ph_{0,n}}{\sum_{k=1}^{K} a_{k,n} P \beta_{k,n} h_{k,n}^s g_{k,n}^l + \sigma_l^2};$$

where a first term of a denominator is interference caused by the backscatter of the BDs to the main transmission, the transmission rate $R_s(n)$ of the BS to the cellular user is:

$$R_s(n) = W \log_2(1 + \gamma_s(n));$$

where W is a channel bandwidth;
the received signal of the UAV at the time $\tau_n$ is:

$$y_{u,k}(n) = \sqrt{Ph_{1,n}} S_n + y'_{k,n}(n) \sqrt{g_{k,n}^u} + Z_n^u;$$

where $Z_n^u \sim (0, \sigma_u^2)$ denotes the noise received at the UAV, $\sqrt{Ph_{1,n}} S_n$ is a direct link interference from the BS to the UAV, a strength of the signal is stronger than a backscattered link, in order to decode a signal $C_{k,n}$ of the $K_{th}$ BD, $\sqrt{Ph_{1,n}} S_n$ is removed by a successive interference cancellation (SIC) technique, a residual signal interference exists after the SIC, which is known as an incomplete SIC, the signal-to-noise ratio $\gamma_{c,k}(n)$ of decoding the signal $C_{k,n}$ of the $K_{th}$ BD at the UAV is:

$$\gamma_{c,k}(n) = \frac{\psi P a_{k,n} \beta_{k,n} h_{k,n}^s g_{k,n}^u}{\sigma_u^2};$$

where $\Psi$ is an incomplete SIC coefficient;
the backscatter transmission rate $R_{c,k}(n)$ of the $K_{th}$ BD at the time $\tau_n$ is:

$$R_{c,k}(n) = \frac{\tau_{k,n}^b}{\delta} W \log_2(1 + \gamma_{c,k}(n));$$

where $\tau_{k,n}^b$ denotes the time length allocated to the BDs within the communication range of the UAV, $\delta$ is the time length of each time period, W is the channel bandwidth, and $\gamma_{c,k}(n)$ is the signal-to-noise ratio $\gamma_{c,k}(n)$ of decoding the signal $C_{k,n}$ of the $K_{th}$ BD at the UAV.

In one embodiment, the optimization problem of the UAV-assisted symbiotic radio system is:

$$\max_{\{\tau_n^b, \beta_n, q_n\}} R_{sum};$$

the constraints are:

$$\frac{T}{N} = \sum_{k=1}^{K} \tau_{k,n}^b, \tau_{k,n}^b \geq 0, \forall k, \forall n \qquad (1)$$

$$0 \leq \beta_{k,n} \leq \beta_{max}, \forall k, \forall n \qquad (2)$$

$$\sum_{n=1}^{N} R_s(n) \geq R_{min}^s \qquad (3)$$

$$\sum_{n=1}^{N} R_{c,k}(n) \geq R_{min}^b, \forall k \qquad (4)$$

$$E_0 + E_k \geq E_{min}, \forall k \qquad (5)$$

$$\frac{\|q_n - q_{n-1}\|}{\delta} \leq V_{max}, \forall n \qquad (6)$$

$$q_1 = q_T \qquad (7)$$

wherein a constraint (1) is a limitation of the total communication time and a range of the backscatter time of the BD, the total communication time T is divided into N time periods on average, and the time length of each time period is $\delta$; $\tau_{k,n}^b$ denotes the time length allocated to the BDs within the communication range of the UAV at the time $\tau_n$; a constraint (2) denotes a value range of the reflection coefficient of the $\beta_{k,n}$ denotes the reflection coefficient of the $K_{th}$ BD at the time $\tau_n$, and $\beta_{max}$ is a maximum value of the reflection coefficient of the BD; in a constraint (3), $R_s(n)$ is the transmission rate of the BS to the cellular user, $R_{min}^s$ represents a minimum requirement of the main transmission rate and guarantees to satisfy the QoS of the cellular user; a constraint (4) is a requirement of the backscatter rate of the BD, $R_{c,k}(n)$ is the backscatter transmission rate of the $K_{th}$ BD at the time $\tau_n$, and $R_{min}^b$ is a minimum value of the transmission rate of the BD; and a constraint (5) is a causality of the energy, which means that power consumption of each BD in the transmission process does not exceed its initial energy $E_0$ and a sum of the collected energy $E_k$, $E_{min}$ represents the minimum energy required by working circuits of each BD; in a constraint (6), $q_n$ is the two-dimensional position of the UAV at the time $\tau_n$, $V_{max}$ is a maximum speed of the UAV, which is limited by restricting a distance the UAV flies in each time period; in a constraint (7), assuming that the UAV starts from an initial position $q_1$ and flies back to its initial position at an end of the time period, and $q_T$ is a position at the end of the time period.

In a second aspect, the present application provides a resource allocation device for a UAV-assisted symbiotic radio system, including a processor and a storage medium;
the storage medium is configured to store instructions;
the processor is configured to operate according to the instructions to perform the method according to any one of methods of the first aspect.

In a third aspect, the present application provides a storage medium having a computer programme stored thereon, wherein the computer programme is executed by the processor to implement the method according to any one of methods of the first aspect.

In a fourth aspect, the present application provides a computing device, including:
one or more processors;
one or more memories; and
one or more programmes;
wherein the one or more programmes are stored in the one or more memories and configured to be executed by the one or more processors, the one or more programmes comprise instructions for implementing the method according to any one of methods of the first aspect.

Beneficial effect: relative to the related art, the advantages of the present application include:

1. The present application integrates the energy collection of passive BDs and symbiotic radio technology to construct a data collection system. The passive BDs use the signal transmitted by the BS to the cellular user for energy collection to maintain the working of the circuit, and adopts the symbiotic radio technology to backscatter the information from the passive BDs to the UAV, which is a process of backscatter transmission.

2. The present application jointly considers the symbiotic radio system and assistance of the UAV. The passive BD uses the RF signal sent from the base station to the cellular users to complete the energy collection and backscatter communication, i.e., the main transmission system and the backscatter system share the spectrum, while the flexible mobility of the UAV is utilized as a receiver to collect the data from all the BDs.

3. Unlike the traditional UAV-assisted backscatter communication system, this method makes full use of RF sources in the surrounding environment, i.e., it only uses symbiotic radio technology, without additional RF sources. Meanwhile, the UAV-assisted backscatter transmission not only improves the utilization of spectrum resources, but also solves the problem that the backscatter rate is too low.

DETAILED DESCRIPTION OF THE EMBODIMENTS

Figure 1:
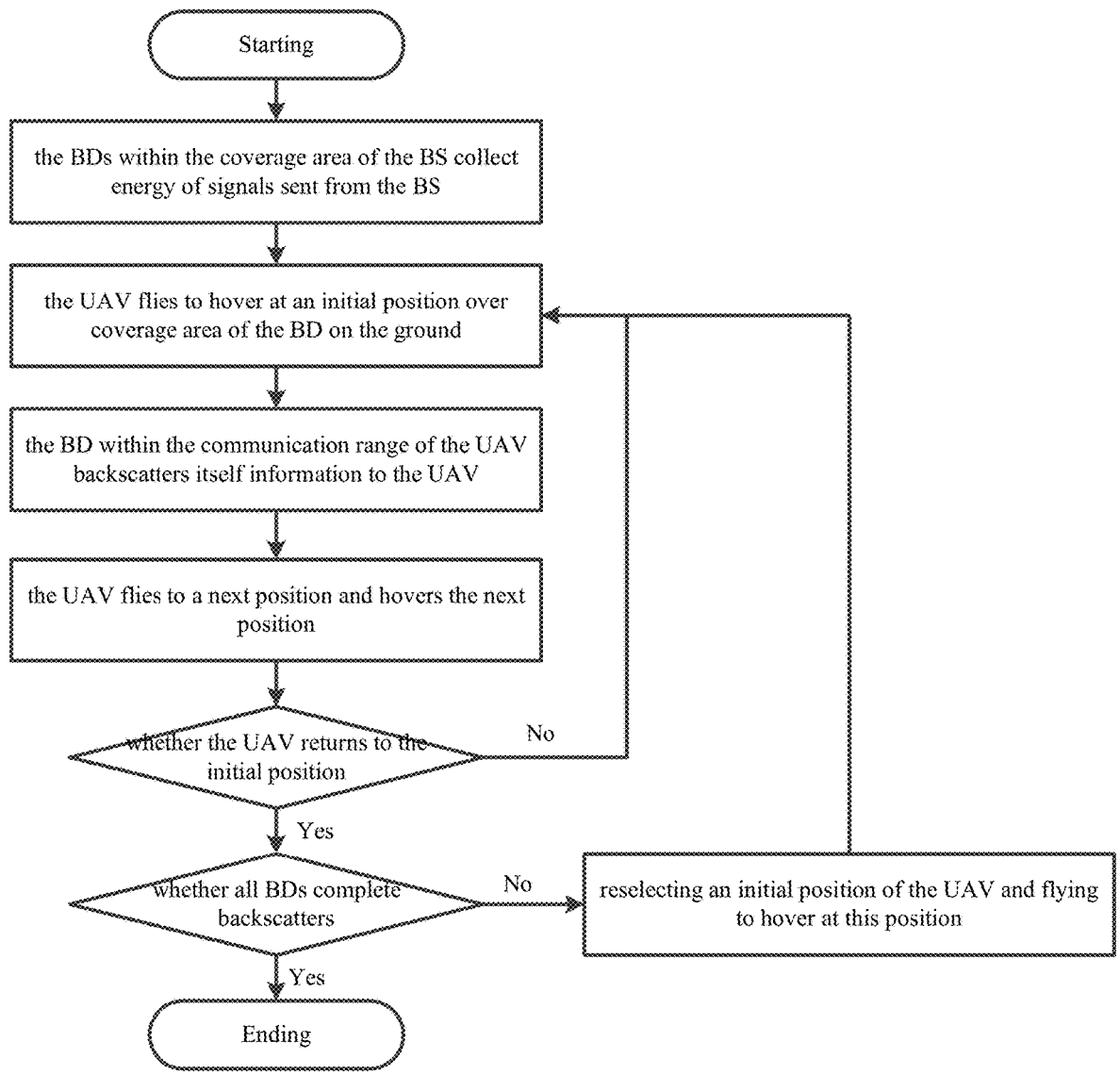
FIG. 1 is a flowchart of a method according to embodiments of the present application.

The present application is further described below in conjunction with the accompanying drawings. The following embodiments are only used to illustrate the technical solution of the present application more clearly, and cannot be used to limit the scope of the present application.

In the description of the present application, the terms "an embodiment", "some embodiments", "schematic embodiment", "example", "specific example", or "some examples" mean that the specific features, structures, materials, or characteristics described in connection with the embodiment or example are included in at least one embodiment or example of the present application. In this specification, schematic expressions of the above terms do not necessarily refer to the same embodiment or example. Moreover, the specific features, structures, materials or characteristics described may be combined in any one or more embodiments or examples in a suitable manner.

Embodiment I

The embodiment provides a resource allocation method for a unmanned aerial vehicle (UAV)-assisted symbiotic radio system, including a base station (BS) and a plurality of backscatter devices (BDs) distributed within a coverage area of the BS and a cellular user. When the BS sends a signal to the cellular user, the BDs within the coverage area of the BS collect energy of a radio frequency signal sent from the BS and perform backscatter with a time division multiple access method, and the UAV receives backscattered signals from the BDs and collects data from all the BDs on a ground;

the resource allocation method for the symbiotic radio system includes:

constructing an optimization problem for the UAV-assisted symbiotic radio system by taking that maximizing a sum rate of all the BDs, and guaranteeing a minimum rate of each BD and QoS requirements of the cellular user as an objective function and constraints;

solving the optimization problem to obtain time allocations of the BDs, reflection coefficients of the BDs and a position of the UAV of joint optimization for each time period in a preset period; and based on obtained the time allocations of the BDs, the reflection coefficients of the BDs and the position of the UAV of the joint optimization for each time period, collecting the data by the UAV-assisted symbiotic radio system in a preset cycle.

In one embodiment, the S3 includes:

dividing a total communication time T of the preset cycle into N time periods on average, wherein $\delta$ is a time length of one time period;

S301, the UAV flying to hover at a position $q_n$ of the UAV in a first time period obtained by the joint optimization over a range where the BDs on the ground are located, n=1;

S302, in response to the BS sending the signal, all BDs within the coverage area of the BS collecting energy of the signal according to a time length $\tau_{k,n}^b$ allocated to the BDs and the reflection coefficients $\beta_{k,n}$ of the BDs obtained by the joint optimization;

S303, the BDs located within a communication range of the UAV performing backscatter with the time division multiple access (TDMA) method according to the time length $\tau_{k,n}^b$ allocated to the BDs obtained by the joint optimization, and transmitting reflected information of the BDs to the UAV by using the signal sent from the BS;

S304, after a time length $\delta$ of one time period, the UAV collecting completely data at a current position, n=n+1, and the UAV flying to hover at a position $q_n$ of the UAV in a next time period obtained by the joint optimization; and S305, repeating S302 and S304 according to the obtained the time allocations of the BDs, the reflection coefficients of the BDs and the position of the UAV in the next time period of the joint optimization for each time period until the UAV returns to an initial position and collects completely the data.

In one embodiment, the constructing the optimization problem for the UAV-assisted symbiotic radio system includes:

S101, constructing a computational model of total energy $E_k$ collected by a $K_{th}$ BD during the communication time T based on the time length $\tau_{k,n}^b$ allocated to the BDs and the reflection coefficients $\beta_{k,n}$ of the BDs;

S102, constructing a computational model of a transmission rate $R_s(n)$ of the BS to the cellular user, and a backscattered transmission rate $R_{c,k}(n)$ of the $K_{th}$ BD at the time $\tau_n$; and S103, constructing the optimization problem of the UAV-assisted symbiotic radio system based on the computational model of $E_k$, $R_s(n)$, and $R_{c,k}(n)$.

Figure 2:
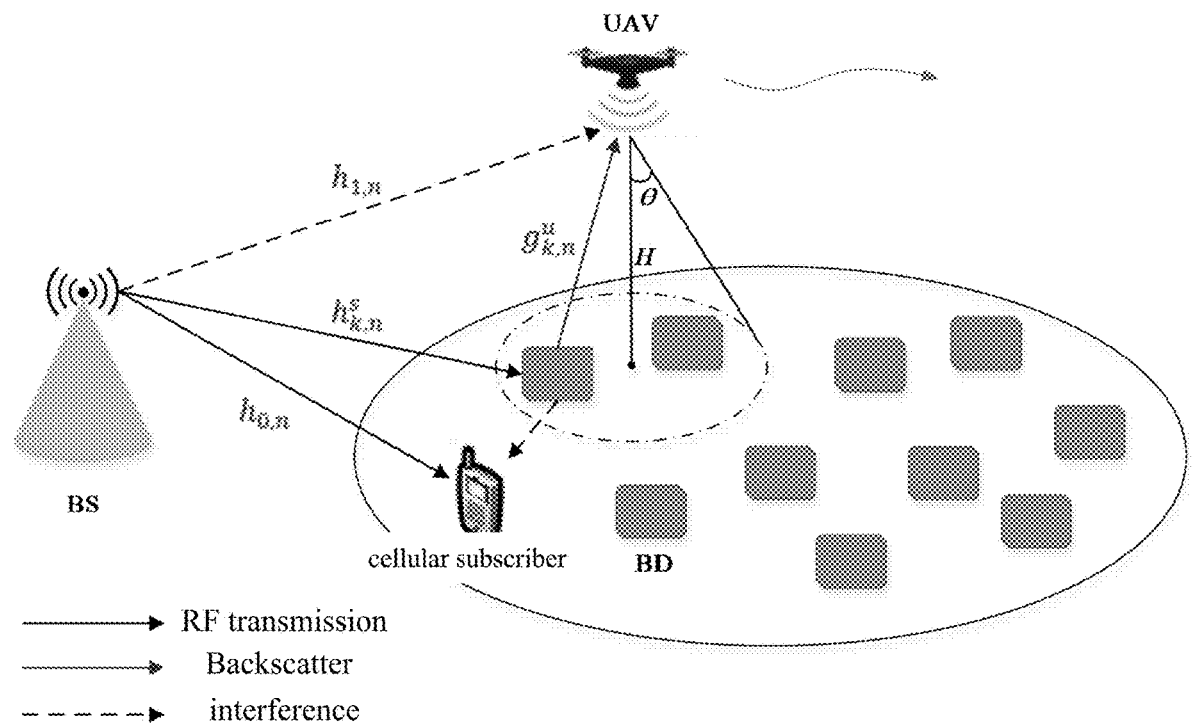
FIG. 2 is a schematic diagram of a system model according to embodiments of the present application.
Figure 3:
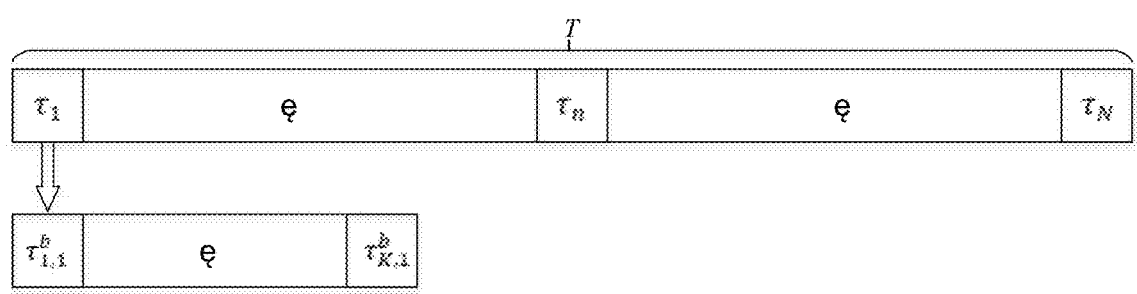
FIG. 3 is a schematic diagram of a time allocation scheme according to embodiments of the present application.

In some embodiments, with reference to FIGS. 1, 2 and 3, the present embodiment provides a resource allocation method for a unmanned aerial vehicle (UAV)-assisted symbiotic radio system that performs the following steps in a preset cycle to maximize the backscatter rate of all devices by optimizing the position of the UAV and the communication resources (backscatter coefficients and the time allocated to reflection) in the system. All BDs are randomly distributed within the coverage area 20×20m² of the base station in which they are located;

In one embodiment, the constructing the computational model of total energy $E_k$ collected by the $K_{th}$ BD during the communication time T based on the time length $\tau_{k,n}^b$ allocated to the BDs and the reflection coefficients $\beta_{k,n}$ of the BDs includes:

the BD devices and cellular users are randomly distributed within the coverage area of the Base Station (BS), where the BS transmits a signal that not only serves the cellular user, but whose energy is also collected by all BDs.

when the BDs are located within the communication range of the UAV, the received signal of the BD is divided into two portions, one portion is configured to support the backscattered transmission of the BD, and energy of the other portion is collected by the BDs for consumption by their circuits;

wherein $\alpha_{k,n}$, $k\in\{1,2,\ldots,k,\ldots,K\}$, $n\in\{1,2,\ldots,n,\ldots,N\}$ represents 0-1 indication coefficient that indicates whether or not the BD is backscattered, K is a total number of the BDs, and N represents that a number of time periods by which a total communication time is divided into, and when the $K_{th}$ BD is located within the communication range of the UAV at the time $\tau_n$, i.e., a horizontal distance between the UAV and the $K_{th}$ BD is less than or equal to the communication radius r of the UAV, $\alpha_{k,n}=1$, a formula is:

$$a_{k,n} = \begin{cases} 1, & \|q_n - w_k\| \leq r \\ 0, & \|q_n - w_k\| > r \end{cases};$$

where $q_n$ is a two-dimensional position of the UAV at the time $\tau_n$, $w_k=(w_k^x, w_k^y)$ is the two-dimensional position of the $K_{th}$ BD, the communication radius is $r=H\tan\theta$, H is a height of the UAV, and $\theta$ is an effective communication angle of the UAV, backscatter time allocated to the $K_{th}$ BD is expressed as $\tau_{k,n}^b = \alpha_{k,n}\tau_{k,n}$;

assuming that channel state information is known, channel gains from the BS to the cellular user, from the BS to the $K_{th}$ BD and from the $K_{th}$ BD to the cellular user are denoted by $h_{0,n}$, $h_{k,n}^s$, $g_{k,n}^l$, and assuming that these three terrestrial channels take into account both large-scale and small-scale fading, formulas are:

$$h_{0,n}=\xi_0(d_{0,n})^{-\alpha}\|\mu_{0,n}\|^2$$

$$h_{k,n}^s=\xi_0(d_{k,n}^s)^{-\alpha}\|\mu_{k,n}^s\|^2$$

$$g_{k,n}^l=\xi_0(d_{k,n}^l)^{-\alpha}\|\mu_{k,n}^l\|^2;$$

where $d_{0,n}=\sqrt{\|q_L-q_B\|^2}$, $d_{k,n}^s=\sqrt{\|q_B-w_k\|^2}$, $d_{k,n}^l=\sqrt{\|q_L-w_k\|^2}$ denote distances of the BS from the cellular user and the $K_{th}$ BD, and a distance of the $K_{th}$ BD from the cellular user, respectively, and $q_B$ and $q_L$ denote a two-dimensional position of the BS and a two-dimensional position of the cellular user, respectively, and $\mu_{0,n}$, $\mu_{k,n}^s$ and $\mu_{k,n}^l$ denote small-scale fading components, $\xi_0$ is a channel power gain when $d_0=1m$, and $\alpha$ represents a path loss exponent;

channel gains from the BS to the UAV and from the $K_{th}$ BD to the UAV are denoted as $h_{1,n}$, $g_{k,n}^u$, respectively, and a communication between the BS and the UAV is a line-of-sight channel, considering only the large-scale fading, denoted as:

$$h_{1,n}=\xi_0(d_{1,n})^{-2}$$

$$g_{k,n}^u=\xi_0(d_{k,n}^u)^{-2};$$

where $d_{1,n}$ is a distance between the BS and the UAV, and $d_{k,n}^u$ is a distance between the UAV and the BD;

when at the time $\tau_n$, when the $K_{th}$ BD performs no backscatter communication, $\alpha_{k,n}=0$, all signals received by the $K_{th}$ BD are used for energy collection; when the $K_{th}$ BD performs the backscatter communication and energy collection simultaneously, then $\alpha_{k,n}=1$; $\beta_{k,n}$ denotes the reflection coefficient of the BD at the time $\tau_n$, and $0\leq\beta_{k,n}\leq\beta_{max}$, $\beta_{max}(0<\beta_{max}<1)$ is the maximum reflection coefficient that is achievable in practical applications;

the total energy $E_k$ collected by the $K_{th}$ BD during the communication time T is:

$$E_k = \sum_{n=1}^{N}\eta_k[\tau_{k,n}^b P(1-\beta_{k,n})h_{k,n}^s + Ph_{k,n}^s(T/N - \tau_{k,n}^b)]$$

$$= \sum_{n=1}^{N}\eta_k Ph_{k,n}^s(T/N - \tau_{k,n}^b\beta_{k,n})$$

where P is a transmitting power of the BS, $\eta_k$ is an energy collection efficiency factor of each BD, and the total communication time T is divided equally into N time periods, $\tau_{k,n}^b$ represents the time length allocated to the BDs within the communication range of the UAV at the time $\tau_n$.

In one embodiment, the S102 includes:

communicating between the UAV and the BDs with the time division multiple access method; assuming that the total communication time is divided equally into N time periods, i.e., $T=N\delta$, the position of the UAV on a two-dimensional horizontal plane at the time $\tau_n$, $n\in\{1,2,\ldots,n,\ldots,N\}$ is represented as $q_n=(x_n, y_n)$;

the UAV hovers over the position $q_n$ in each time period $\tau_n$, at which time the BDs on the ground communicate with the UAV by the TDMA, $k\in\{1,2,\ldots,k,\ldots,K\}$ is the time length allocated to the BDs; the time length allocated to the BD within the communication range of the UAV at the time $\tau_n$ is $\tau_{k,n}^b = \alpha_{k,n}\tau_{k,n}$;

$S_n$ denotes a main transmission signal sent by the BS at the time $\tau_n$, $E[\|S_n\|^2]=1$, then the transmission signal $y_{b,k}(n)$ received by the $K_{th}$ BD from the BS is:

$$y_{b,k}(n)=\sqrt{Ph_{k,n}^s}S_n;$$

$C_{k,n}$ denotes the signal of the $K_{th}$ BD at the time, $\tau_n$; $E[\|C_n\|^2]=1$, the signal $y_{k,n}'(n)$ backscattered by the BD is:

$$y_{k,n}'(n)=\alpha_{k,n}\sqrt{P\beta_{k,n}h_{k,n}^s}S_nC_{k,n};$$

a reflected signal of the $K_{th}$ BD disturbs the cellular user, the received signal $y_l(n)$ of the cellular user at the time $\tau_n$ is:

$$y_l(n) = \sqrt{Ph_{0,n}}S_n + \sum_{k=1}^{K}y_{k,n}'(n)\sqrt{g_{k,n}^l} + Z_n^l;$$

where $Z_n^l$ is a noise received by the cellular user and $Z_n^l \sim (0,\sigma_l^2)$;

a signal-to-noise ratio $\gamma_s(n)$ of decoding a main transmission signal $S_n$ by the cellular user is calculated:

$$\gamma_s(n) = \frac{Ph_{0,n}}{\sum_{k=1}^{K}a_{k,n}P\beta_{k,n}h_{k,n}^s g_{k,n}^l + \sigma_l^2};$$

where a first term of a denominator is interference caused by the backscatter of the BDs to the main transmission, the transmission rate $R_s(n)$ of the BS to the cellular user is:

$$R_s(n)=W\log_2(1+\gamma_s(n));$$

where W is a channel bandwidth;

the received signal of the UAV at the time $\tau_n$ is:

$$y_{u,k}(n)=\sqrt{Ph_{1,n}}S_n+y_{k,n}'(n)\sqrt{g_{k,n}^u}+Z_n^u;$$

where $Z_n^u \sim (0,\sigma_u^2)$ denotes the noise received at the UAV, $\sqrt{Ph_{1,n}}S_n$ is a direct link interference from the BS to the UAV, a strength of the signal is stronger than a backscattered link, in order to decode a signal $C_{k,n}$ of the $K_{th}$ BD, $\sqrt{Ph_{1,n}}S_n$ is removed by a successive interference cancellation (SIC) technique, a residual signal interference exists after the SIC, which is known as an incomplete SIC, the signal-to-noise ratio of $\gamma_{c,k}(n)$ of decoding the signal $C_{k,n}$ of the $K_{th}$ BD at the UAV is:

$$\gamma_{c,k}(n) = \frac{\psi P a_{k,n} \beta_{k,n} h_{k,n}^s g_{k,n}^u}{\sigma_u^2};$$

where $\Psi$ is an incomplete SIC coefficient;

the backscatter transmission rate $R_{c,k}(n)$ of the $K_{th}$ BD at the time $\tau_n$ is:

$$R_{c,k}(n) = \frac{\tau_{k,n}^b}{\delta} W \log_2(1 + \gamma_{c,k}(n));$$

where $\tau_{k,n}^b$ denotes the time length allocated to the BDs within the communication range of the UAV, $\delta$ is the time length of each time period, W is the channel bandwidth, and $\gamma_{c,k}(n)$ is the signal-to-noise ratio $\gamma_{c,k}(n)$ of decoding the signal $C_{k,n}$ of the $K_{th}$ BD at the UAV.

In one embodiment, the optimization problem of the UAV-assisted symbiotic radio system is:

$$\max_{\{\tau_n^b, \beta_n, q_n\}} R_{sum};$$

the constraints are:

$$\frac{T}{N} = \sum_{k=1}^{K} \tau_{k,n}^b, \tau_{k,n}^b \geq 0, \forall k, \forall n \quad (1)$$

$$0 \leq \beta_{k,n} \leq \beta_{max}, \forall k, \forall n \quad (2)$$

$$\sum_{n=1}^{N} R_s(n) \geq R_{min}^s \quad (3)$$

$$\sum_{n=1}^{N} R_{c,k}(n) \geq R_{min}^b, \forall k \quad (4)$$

$$E_0 + E_k \geq E_{min}, \forall k \quad (5)$$

$$\frac{\|q_n - q_{n-1}\|}{\delta} \leq V_{max}, \forall n \quad (6)$$

$$q_1 = q_T \quad (7)$$

wherein a constraint (1) is a limitation of the total communication time and a range of the backscatter time of the BD, the total communication time T is divided into N time periods on average, and the time length of each time period is $\delta$; $\tau_{k,n}^b$ denotes the time length allocated to the BDs within the communication range of the UAV at the time $\tau_n$; a constraint (2) denotes a value range of the reflection coefficient of the BD, $\beta_{k,n}$ denotes the reflection coefficient of the $K_{th}$ BD at the time $\tau_n$, and $\beta_{max}$ is a maximum value of the reflection coefficient of the BD; in a constraint (3), $R_s(n)$ is the transmission rate of the BS to the cellular user, $R_{min}^s$ represents a minimum requirement of the main transmission rate and guarantees to satisfy the QoS of the cellular user; a constraint (4) is a requirement of the backscatter rate of the BD, $R_{c,k}(n)$ is the backscatter transmission rate of the $K_{th}$ BD at the time $\tau_n$, and $R_{min}^b$ is a minimum value of the transmission rate of the BD; and a constraint (5) is a causality of the energy, which means that power consumption of each BD in the transmission process does not exceed its initial energy $E_0$ and a sum of the collected energy $E_k$, $E_{min}$ represents the minimum energy required by working circuits of each BD; in a constraint (6), $q_n$ is the two-dimensional position of the UAV at the time $\tau_n$, $V_{max}$ is a maximum speed of the UAV, which is limited by restricting a distance the UAV flies in each time period; in a constraint (7), assuming that the UAV starts from an initial position $q_1$ and flies back to its initial position at an end of the time period, and $q_T$ is a position at the end of the time period.

Embodiment II

In a second aspect, the present application provides a resource allocation device for a UAV-assisted symbiotic radio system, including a processor and a storage medium;
wherein the storage medium is configured to store instructions;
the processor is configured to operate according to the instructions to perform the method according to any one of methods of the first aspect.

Embodiment III

In a third aspect, the present application provides a storage medium having a computer programme stored thereon, wherein the computer programme is executed by the processor to implement the method according to any one of methods of the first aspect.

Embodiment IIII

In a fourth aspect, the present application provides a computing device, including:
one or more processors;
one or more memories; and
one or more programmes;
wherein the one or more programmes are stored in the one or more memories and configured to be executed by the one or more processors, the one or more programmes comprise instructions for implementing the method according to any one of methods of the first aspect.

It should be appreciated by those skilled in the art that embodiments of the present application may be provided as methods, systems, or computer program products. Accordingly, the present application may take the form of a fully hardware embodiment, a fully software embodiment, or an embodiment that combines software and hardware aspects. Further, the present application may take the form of a computer program product implemented on one or more computer-usable storage media (including, but not limited to, disk memory, CD-ROM, optical memory, etc.) containing computer-usable program code therein.

The present application is described with reference to flowcharts and/or block diagrams of methods, devices (systems), and computer program products according to embodiments of the present application. It should be understood that each of the processes and/or boxes in the flowchart and/or block diagram, and the combination of processes and/or boxes in the flowchart and/or block diagram, may be implemented by computer program instructions. These computer program instructions may be provided to a processor of a general-purpose computer, a special-purpose computer, an embedded processor, or other programmable data-processing device to produce a machine such that the instructions executed by the processor of the computer or other programmable data-processing device produce a device for carrying out the functions specified in the one process or processes of the flowchart and/or the one box or boxes of the block diagram.

These computer program instructions may also be stored in computer-readable memory capable of directing the computer or other programmable data processing device to operate in a particular manner, such that the instructions stored in that computer-readable memory produce an article of manufacture comprising an instruction device that implements the function specified in one process or a plurality of processes in the flowchart and/or one box or a plurality of boxes in the block diagram.

These computer program instructions may also be loaded onto a computer or other programmable data processing device such that a series of operational steps are performed on the computer or other programmable device to produce computer-implemented processing, such that the instructions performed on the computer or other programmable device provide steps for implementing the functionality specified in one process or a plurality of processes in the flowchart and/or one box or a plurality of boxes in the block diagram.

The above embodiments of the present application are described in detail in connection with the accompanying drawings, but the present application is not limited to the above embodiments, and various variations may be made within the scope of knowledge possessed by those skilled in the art without departing from the purposes of the present application.

What is claimed is:

1. A resource allocation method for a unmanned aerial vehicle (UAV)-assisted symbiotic radio system, comprising a base station (BS) and a plurality of backscatter devices (BDs) distributed within a coverage area of the BS and a cellular user;
   wherein when the BS sends a signal to the cellular user, the BDs within the coverage area of the BS collect energy of a radio frequency signal sent from the BS and perform backscatter with a time division multiple access method, and the UAV receives backscattered signals from the BDs and collects data from all the BDs on a ground;
   wherein the resource allocation method for the symbiotic radio system comprises:
   step S1, constructing an optimization problem for the UAV-assisted symbiotic radio system by taking that maximizing a sum rate of all the BDs, and guaranteeing a minimum rate of each BD and QoS requirements of the cellular user as an objective function and constraints;
   step S2, solving the optimization problem to obtain time allocations of the BDs, reflection coefficients of the BDs and a position of the UAV of joint optimization for each time period in a preset period; and
   step S3, based on obtained the time allocations of the BDs, the reflection coefficients of the BDs and the position of the UAV of the joint optimization for each time period, collecting the data by the UAV-assisted symbiotic radio system in a preset cycle;
   wherein the step S3 comprises:
   dividing a total communication time T of the preset cycle into N time periods on average, wherein $\delta$ is a time length of one time period;
   step S301, the UAV flying to hover at a position $q_n$ of the UAV in a first time period obtained by the joint optimization over a range where the BDs on the ground are located, n=1;
   step S302, in response to the BS sending the signal, all BDs within the coverage area of the BS collecting energy of the signal according to a time length $\tau_{k,n}^b$ allocated to the BDs and the reflection coefficients $\beta_{k,n}$ of the BDs obtained by the joint optimization;
   step S303, the BDs located within a communication range of the UAV performing backscatter with the time division multiple access (TDMA) method according to the time length $\tau_{k,n}^b$ allocated to the BDs obtained by the joint optimization, and transmitting reflected information of the BDs to the UAV by using the signal sent from the BS;
   step S304, after the time length $\delta$ of one time period, the UAV collecting completely data at a current position, n=n+1, and the UAV flying to hover at the position $q_n$ of the UAV in a next time period obtained by the joint optimization; and
   step S305, repeating steps S302 and S304 according to the obtained time allocations of the BDs, the reflection coefficients of the BDs and the position of the UAV in the next time period of the joint optimization for each time period until the UAV returns to an initial position and collects completely the data.

2. The resource allocation method for the UAV-assisted symbiotic radio system according to claim 1, wherein the constructing the optimization problem for the UAV-assisted symbiotic radio system comprises:
   step S101, constructing a computational model of total energy $E_k$ collected by a $K_{th}$ BD during the communication time T based on the time length $\tau_{k,n}^b$ allocated to the BDs and the reflection coefficients $\beta_{k,n}$ of the BDs;
   step S102, constructing a computational model of a transmission rate $R_s(n)$ of the BS to the cellular user, and a backscattered transmission rate $R_{c,k}(n)$ of the $K_{th}$ BD at the time $\tau_n$; and
   step S103, constructing the optimization problem of the UAV-assisted symbiotic radio system based on the computational model of $E_k$, $R_s(n)$, and $R_{c,k}(n)$.

3. The resource allocation method for the UAV-assisted symbiotic radio system according to claim 2, wherein the step S101 comprises:
   when the BD is located within the communication range of the UAV, the received signal of the BD is divided into two portions, one portion is configured to support the backscattered transmission of the BD, and energy of the other portion is collected by the BDs for consumption by their circuits;
   wherein $\alpha_{k,n}$·k$\in\{1,2,\ldots,k,\ldots,K\}$, n$\in\{1,2,\ldots,n,\ldots,N\}$ represents 0-1 indication coefficient that indicates whether the BD is backscattered, K is a total number of the BDs, and N represents that a number of time periods by which a total communication time is divided into, and when the $K_{th}$ BD is located within the communication range of the UAV at the time $\tau_n$, i.e., a horizontal distance between the UAV and the $K_{th}$ BD is less than or equal to the communication radius r of the UAV, $\alpha_{k,n}=1$, a formula is:

$$a_{k,n} = \begin{cases} 1, & \|q_n - w_k\| \le r \\ 0, & \|q_n - w_k\| > r \end{cases};$$

where $q_n$ is a two-dimensional position of the UAV at the time $\tau_n$, $w_k=(w_k^x, w_k^y)$ is the two-dimensional position of the $K_{th}$ BD, the communication radius is $r=H\tan\theta$, H is a height of the UAV, and $\theta$ is an effective communication angle of the UAV, backscatter time allocated to the $K_{th}$ BD is expressed as $\tau_{k,n}^b=\alpha_{k,n}\tau_{k,n}$; assuming that channel state information is known, channel gains from the BS to the cellular user, from the BS to the $K_{th}$ BD and from the $K_{th}$ BD to the cellular user are denoted by $h_{0,n}$, $h_{k,n}^s$, $g_{k,n}^l$, and assuming that these three terrestrial channels take into account both large-scale and small-scale fading, formulas are:

$$h_{0,n}=\xi_0(d_{0,n})^{-\alpha}\|\mu_{0,n}\|^2$$

$$h_{k,n}^s=\xi_0(d_{k,n}^s)^{-\alpha}\|\mu_{k,n}^s\|^2$$

$$g_{k,n}^l=\xi_0(d_{k,n}^l)^{-\alpha}\|\mu_{k,n}^l\|^2;$$

where $d_{0,n}=\sqrt{\|q_L-q_B\|^2}$, $d_{k,n}^s=\sqrt{\|q_B-w_k\|^2}$, $d_{k,n}^l=\sqrt{\|q_L-w_k\|^2}$ denote distances of the BS from the cellular user and the $K_{th}$ BD, and a distance of the $K_{th}$ BD from the cellular user, respectively, and $q_B$ and $q_L$ denote a two-dimensional position of the BS and a two-dimensional position of the cellular user, respectively, and $\mu_{0,n}$, $\mu_{k,n}^s$ and $\mu_{k,n}^l$ denote small-scale fading components, $\xi_0$ is a channel power gain when $d_0=1m$, and $\alpha$ represents a path loss exponent;

channel gains from the BS to the UAV and from the $K_{th}$ BD to the UAV are denoted as $h_{1,n}$, $g_{k,n}^u$, respectively, and a communication between the BS and the UAV is a line-of-sight channel, considering only the large-scale fading, denoted as:

$$h_{1,n}=\xi_0(d_{1,n})^{-2}$$

$$g_{k,n}^u=\xi_0(d_{k,n}^u)^{-2};$$

where $d_{l,n}$ is a distance between the BS and the UAV, and $d_{k,n}^u$ is a distance between the UAV and the BD;

when at the time $\tau_n$, when the $K_{th}$ BD performs no backscatter communication, $\alpha_{k,n}=0$, all signals received by the $K_{th}$ BD are used for energy collection; when the $K_{th}$ BD performs the backscatter communication and energy collection simultaneously, then $\alpha_{k,n}=1$; $\beta_{k,n}$ denotes the reflection coefficient of the BD at the time $\tau_n$, and $0 \le \beta_{k,n} \le \beta_{max}$, $\beta_{max}(0<\beta_{max}<1)$ is the maximum reflection coefficient that is achievable in practical applications;

the total energy $E_k$ collected by the $K_{th}$ BD during the communication time T is:

$$E_k = \sum_{n=1}^{N} \eta_k \left[ \tau_{k,n}^b P(1-\beta_{k,n})h_{k,n}^s + Ph_{k,n}^s(T/N - \tau_{k,n}^b) \right]$$

$$= \sum_{n=1}^{N} \eta_k Ph_{k,n}^s(T/N - \tau_{k,n}^b \beta_{k,n})$$

where P is a transmitting power of the BS, $\eta_k$ is an energy collection efficiency factor of each BD, and the total communication time T is divided equally into N time periods, $\tau_{k,n}^b$ represents the time length allocated to the BDs within the communication range of the UAV at the time $\tau_n$.

4. The resource allocation method for the UAV-assisted symbiotic radio system according to claim 3, wherein the step S102 comprises:

communicating between the UAV and the BDs with the time division multiple access method; assuming that the total communication time is divided equally into N time periods, i.e., $T=N\delta$, the position of the UAV on a two-dimensional horizontal plane at the time $\tau_n$, $n \in \{1, 2, \ldots, n, \ldots, N\}$ is represented as $q_n=(x_n, y_n)$;

the UAV hovers over the position $q_n$ in each time period $\tau_n$, at which time the BDs on the ground communicate with the UAV by the TDMA, $k \in \{1,2, \ldots, k, \ldots, K\}$ is the time length allocated to the BDs; the time length allocated to the BD within the communication range of the UAV at the time $\tau_n$ is $\tau_{k,n}^b=\alpha_{k,n}\tau_{k,n}$;

$S_n$ denotes a main transmission signal sent by the BS at the time $\tau_n$, $E[\|S_n\|^2]=1$, then the transmission signal $y_{b,k}(n)$ received by the $K_{th}$ BD from the BS is:

$$y_{b,k}(n)=\sqrt{Ph_{k,n}^s}S_n;$$

$C_{k,n}$ denotes the signal of the $K_{th}$ BD at the time, $\tau_n$; $E[\|C_n\|^2]=1$, the signal $y_{k,n}'(n)$ backscattered by the BD is:

$$y_{k,n}'(n)=\alpha_{k,n}\sqrt{P\beta_{k,n}h_{k,n}^s}S_nC_{k,n};$$

a reflected signal of the $K_{th}$ BD disturbs the cellular user, the received signal $y_l(n)$ of the cellular user at the time $\tau_n$ is:

$$y_l(n) = \sqrt{Ph_{0,n}}S_n + \sum_{k=1}^{K} y'_{k,n}(n)\sqrt{g_{k,n}^l} + Z_n^l;$$

where $Z_n^l$ is a noise received by the cellular user and $Z_n^l \sim (0, \sigma_l^2)$;

a signal-to-noise ratio $\gamma_s(n)$ of decoding a main transmission signal $S_n$ by the cellular user is calculated:

$$\gamma_s(n) = \frac{Ph_{0,n}}{\sum_{k=1}^{K} a_{k,n}P\beta_{k,n}h_{k,n}^s g_{k,n}^l + \sigma_l^2};$$

where a first term of a denominator is interference caused by the backscatter of the BDs to the main transmission, the transmission rate $R_s(n)$ of the BS to the cellular user is:

$$R_s(n)=W\log_2(1+\gamma_s(n));$$

where W is a channel bandwidth;

the received signal of the UAV at the time $\tau_n$ is:

$$y_{u,k}(n) = \sqrt{Ph_{1,n}} S_n + y_{k,n}'(n)\sqrt{g_{k,n}^u} + Z_n^u;$$

where $Z_n^u \sim (0, \sigma_u^2)$ denotes the noise received at the UAV, $\sqrt{Ph_{1,n}} S_n$ is a direct link interference from the BS to the UAV, a strength of the signal is stronger than a backscattered link, in order to decode a signal $C_{k,n}$ of the $K_{th}$ BD, $\sqrt{Ph_{1,n}} S_n$ is removed by a successive interference cancellation (SIC) technique, a residual signal interference exists after the SIC, which is known as an incomplete SIC, the signal-to-noise ratio of $\gamma_{c,k}(n)$ of decoding the signal $C_{k,n}$ of the $K_{th}$ BD at the UAV is:

$$\gamma_{c,k}(n) = \frac{\psi P a_{k,n} \beta_{k,n} h_{k,n}^s g_{k,n}^u}{\sigma_u^2};$$

where $\Psi$ is an incomplete SIC coefficient;
the backscatter transmission rate $R_{c,k}(n)$ of the $K_{th}$ BD at the time $\tau_n$ is:

$$R_{c,k}(n) = \frac{\tau_{k,n}^b}{\delta} W \log_2(1 + \gamma_{c,k}(n));$$

where $\tau_{k,n}^b$ denotes the time length allocated to the BDs within the communication range of the UAV, $\delta$ is the time length of each time period, W is the channel bandwidth, and $\gamma_{c,k}(n)$ is the signal-to-noise ratio $\gamma_{c,k}(n)$ of decoding the signal $C_{k,n}$ of the $K_{th}$ BD at the UAV.

5. The resource allocation method for the UAV-assisted symbiotic radio system according to claim 1, wherein the optimization problem of the UAV-assisted symbiotic radio system is:

$$\max_{\{\tau_n^b, \beta_n, q_n\}} R_{sum};$$

the constraints are:

$$\frac{T}{N} = \sum_{k=1}^{K} \tau_{k,n}^b, \tau_{k,n}^b \geq 0, \forall k_V \forall n \quad (1)$$

$$0 \leq \beta_{k,n} \leq \beta_{max}, \forall k, \forall n \quad (2)$$

$$\sum_{n=1}^{N} R_s(n) \geq R_{min}^s \quad (3)$$

$$\sum_{n=1}^{N} R_{c,k}(n) \geq R_{min}^b, \forall k \quad (4)$$

$$E_0 + E_k \geq E_{min}, \forall k \quad (5)$$

$$\frac{\|q_n - q_{n-1}\|}{\delta} \leq V_{max}, \forall n \quad (6)$$

$$q_1 = q_T \quad (7)$$

wherein a constraint (1) is a limitation of the total communication time and a range of the backscatter time of the BD, the total communication time T is divided into N time periods on average, and the time length of each time period is $\delta$; $\tau_{k,n}^b$ denotes the time length allocated to the BDs within the communication range of the UAV at the time $\tau_n$; a constraint (2) denotes a value range of the reflection coefficient of the BD, $B_{k,n}$ denotes the reflection coefficient of the $K_{th}$ BD at the time $\tau_n$, and $\beta_{max}$ is a maximum value of the reflection coefficient of the BD; in a constraint (3), $R_s(n)$ is the transmission rate of the BS to the cellular user, $R_{min}^s$ represents a minimum requirement of the main transmission rate and guarantees to satisfy the QoS of the cellular user; a constraint (4) is a requirement of the backscatter rate of the BD, $R_{c,k}(n)$ is the backscatter transmission rate of the $K_{th}$ BD at the time $\tau_n$, and $R_{min}^b$ is a minimum value of the transmission rate of the BD; and a constraint (5) is a causality of the energy, which means that power consumption of each BD in the transmission process does not exceed its initial energy $E_0$ and a sum of the collected energy $E_k$, $E_{min}$ represents the minimum energy required by working circuits of each BD; in a constraint (6), $q_n$ is the two-dimensional position of the UAV at the time $\tau_n$, $V_{max}$ is a maximum speed of the UAV, which is limited by restricting a distance the UAV flies in each time period; in a constraint (7), assuming that the UAV starts from an initial position $q_1$ and flies back to its initial position at an end of the time period, and $q_T$ is a position at the end of the time period.

6. A resource allocation device for a UAV-assisted symbiotic radio system, comprising a processor and a storage medium;
wherein the storage medium is configured to store instructions;
the processor is configured to operate according to the instructions to perform the method according to claim 1.

7. A storage medium having a computer programme stored thereon, wherein the computer programme is executed by the processor to implement the method according to claim 1.

8. A computing device, comprising:
one or more processors;
one or more memories; and
one or more programmes;
wherein the one or more programmes are stored in the one or more memories and configured to be executed by the one or more processors, the one or more programmes comprise instructions for implementing the method according to claim 1.

* * * * *